United States Patent
Moriyama et al.

(10) Patent No.: US 12,325,359 B2
(45) Date of Patent: Jun. 10, 2025

(54) DOOR MIRROR STRUCTURE

(71) Applicant: MAZDA MOTOR CORPORATION, Hiroshima (JP)

(72) Inventors: Yukihiro Moriyama, Hiroshima (JP); Eisuke Kuramoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 542 days.

(21) Appl. No.: 17/820,495

(22) Filed: Aug. 17, 2022

(65) Prior Publication Data
US 2023/0110177 A1    Apr. 13, 2023

(30) Foreign Application Priority Data

Oct. 13, 2021 (JP) ................... 2021-168303

(51) Int. Cl.
*B60R 1/074* (2006.01)
(52) U.S. Cl.
CPC ................... *B60R 1/074* (2013.01)
(58) Field of Classification Search
CPC ....................................... B60R 1/074
USPC ................................. 359/841, 877
See application file for complete search history.

(56) References Cited

U.S. PATENT DOCUMENTS

| | | | | |
|---|---|---|---|---|
| 2,871,761 | A * | 2/1959 | Suyder | B60R 1/006 116/56 |
| 5,886,838 | A * | 3/1999 | Kuramoto | B60R 1/07 359/881 |
| 5,940,230 | A * | 8/1999 | Crandall | B60R 1/074 248/479 |
| 10,780,829 | B2 * | 9/2020 | Van | B60R 1/074 |
| 11,981,262 | B2 * | 5/2024 | Moriyama | B60R 1/006 |
| 12,145,506 | B2 * | 11/2024 | Moriyama | B60J 5/0404 |
| 12,227,132 | B2 * | 2/2025 | Moriyama | B60R 1/074 |
| 2006/0132282 | A1 * | 6/2006 | McCall | B60R 1/12 340/5.2 |
| 2009/0122431 | A1 * | 5/2009 | Horii | B60R 1/06 359/872 |
| 2017/0210297 | A1 * | 7/2017 | Kim | G01S 17/931 |
| 2020/0339036 | A1 | 10/2020 | Kenmochi et al. | |
| 2022/0342066 | A1 * | 10/2022 | Burger | G01S 13/58 |

(Continued)

FOREIGN PATENT DOCUMENTS

JP     2020-179680 A     11/2020

*Primary Examiner* — Ricky D Shafer
(74) *Attorney, Agent, or Firm* — Studebaker Brackett PLLC

(57) ABSTRACT

A door mirror structure comprises a mirror unit and a support member fixing the mirror unit to a frame member inside a side door. The mirror unit comprises a door-mirror body portion, a mirror base having a tip-end portion fixed to the door-mirror body portion and a base-end portion provided away from the tip-end portion, a rotational support axis connected to the base-end portion and rotatably supporting the door-mirror body portion and the mirror base between a mirror-use position and a mirror-storage position, and an electromotive rotational unit rotating the door-mirror body portion and the mirror base between the mirror-use position and the mirror-storage position around an axis line of the rotational support axis. The electromotive rotational unit is provided inside the side door.

14 Claims, 15 Drawing Sheets

(56) References Cited

U.S. PATENT DOCUMENTS

| | | | | |
|---|---|---|---|---|
| 2023/0110322 A1* | 4/2023 | Moriyama | .............. | B60R 1/074 359/841 |
| 2023/0110906 A1* | 4/2023 | Moriyama | ............. | B60J 5/0404 296/146.6 |

* cited by examiner

DOOR MIRROR STRUCTURE

BACKGROUND OF THE INVENTION

The present invention relates to a door mirror structure.

Conventionally, a door mirror structure which is provided with an electromotive rotational unit in order to automatically rotate a door mirror between a usable position and a storage position is known as described in Japanese Patent Laid-Open Publication No. 2020-179680 (US 2020/0339036 A1).

This door mirror structure comprises a door-mirror body portion provided with a mirror, a mirror base protruding, in a vehicle width direction, from a side door, and the electromotive rotational unit stored in the door-mirror body portion. The mirror base is a portion which has a base-end portion and a tip-end portion, extends in the vehicle width direction, and forms an arm portion of the door mirror. The base-end portion of the mirror base is fixed to the side door, and to the tip-end portion of the mirror base is attached the door-mirror body portion so as to rotate around a rotational axis extending in a vertical direction.

The door-mirror body portion is rotated at the tip-end portion of the mirror base by receiving a rotational drive force of the electromotive rotational unit stored therein, so that the door-mirror body portion is rotatable between the mirror-use position and the mirror-storage position. The mirror-use position is the position where the door-mirror body portion protrudes toward an outward side, in the vehicle width direction, from the tip-end portion of the mirror base and the mirror is visible from a cabin inside. Meanwhile, the mirror-storage position is the one where the door-mirror body portion extends substantially in parallel to the side door.

In the above-described door mirror structure, since the electromotive rotational unit is stored inside the door-mirror body portion, a moment applied in a vertical direction which is generated at a position of the electromotive rotational unit becomes large in proportion to the length of the mirror base. Consequently, there is a problem that vibrations of the mirror generated during vehicle traveling may become improperly large.

Further, since the electromotive rotational unit is stored inside the door-mirror body portion, the longitudinal width (i.e., the width in a vehicle longitudinal direction) of the door-mirror body portion becomes large. Consequently, there is a concern that the visibility from the cabin inside may be hindered by the door-mirror body portion.

Meanwhile, while the above-described problem is solved in a case where the electromotive rotational unit is removed from the door mirror, the door-mirror body portion needs to be stored manually in this case, which may deteriorate the user convenience.

SUMMARY OF THE INVENTION

The present invention has been devised in view of the above-described problems, and an object of the present invention is to provide a door mirror structure provided with the electromotive rotational unit which can compatibly attain effective suppression of the vibrations of the mirror during the vehicle traveling and improvement of the visibility from the cabin inside.

The door mirror structure of the present invention comprises a mirror unit, a frame member provided inside the side door, and a support member fixing the mirror unit to the frame member, wherein the mirror unit comprises a door-mirror body portion which is provided with a mirror to obtain a rearward visual field of the vehicle, a mirror base which has a tip-end portion fixed to the door-mirror body portion and a base-end portion provided away from the tip-end portion, a rotational support axis which is connected to the base-end portion of the mirror base and rotatably supports the door-mirror body portion and the mirror base between a mirror-use position where the mirror is visible from a cabin inside and a mirror-storage position which is located on an inward side, in a vehicle width direction, of the mirror-use position, and an electromotive rotational unit which rotates the door-mirror body portion and the mirror base between the mirror-use position and the mirror-storage position around an axis line of the rotational support axis, and the electromotive rotational unit is provided inside the side door.

According to the present invention, since the electromotive rotational unit, which is a heavy object in the mirror unit, is provided inside the side door in the door mirror structure provided with the mirror unit comprising the door-mirror body portion, the mirror base, the rotational support axis, and the electromotive rotational unit to rotate the door-mirror body portion and the mirror base around the axis line of the rotational support axis, the vertical moment generated at the door mirror which is caused by a road-surface input during the vehicle traveling (i.e., vibrations or outer forces which are mainly generated in a vertical direction, which may be caused by an unevenness (concave/convex) of the road surface) can be decreased, so that the vibrations of the mirror can be suppressed. Further, the support rigidity of the mirror unit is improved by the support member fixing the mirror unit, including the electromotive rotational unit, to the frame member, so that the vibrations of the mirror can be suppressed effectively.

Moreover, since the electromotive rotational unit is provided inside the side door, the longitudinal width of the door-mirror body portion can be shortened compared with a conventional door-mirror structure in which the electromotive rotational unit is stored inside the door-mirror body portion, so that the visibility from the cabin inside can be improved.

In an embodiment of the present invention, the rotational support axis is provided to pass between the support member and the frame member, a harness which is connected to a portion of the rotational support axis which is located at a point where the support member and the frame member overlap with each other in a direction perpendicular to an axis-line direction of the rotational support axis is provided, the frame member has a first opening where the harness is inserted at a portion thereof which overlaps with the support member, a size of the first opening is large enough to prevent the harness from contacting an inner peripheral edge of the first opening during the rotation of the door-mirror body portion and the mirror base, and the support member has a pair of fixation portions which are fixed to the frame member at both-side positions of the first opening.

According to this embodiment, since the size of the first opening is large enough to prevent the harness from contacting the inner peripheral edge of the first opening during the rotation of the door-mirror body portion and the mirror base in the structure in which the harness connected to the rotational support axis is inserted into the first opening of the frame member, improper contacting of the harness connected to the rotational support axis with the inner peripheral edge of the first opening of the frame member is suppressed when the electromotive rotational unit is operated. Moreover, the load-transmission function is assisted by the pair of fixation portions of the support member which are fixed to the both-side positions of the first opening, so that the load-transmission function of the frame member in a vehicle side collision can be suppressed from being deteriorated.

In another embodiment of the present invention, the frame member has a first ridgeline which is positioned at an outward side, in the vehicle width direction, of the frame member and extends in a vehicle longitudinal direction, the first opening is formed at a point where the first opening intersects the first ridgeline, and the pair of fixation portions of the support member are fixed to the frame member at respective positions which correspond to the both-side positions of the first opening in a direction along the first ridgeline and to vertical both-side positions of the first ridgeline.

According to this embodiment, since the frame member has the first ridgeline which is positioned on the outward side, in the vehicle width direction, of the frame member and extends in the vehicle longitudinal direction, the rigidity of a portion of the frame member along the first ridgeline is increased. Since the pair of fixation portions of the support member are fixed to the frame member at the respective positions which correspond to the vertical both-side positions of the first ridgeline, the support rigidity of the mirror unit is improved. Meanwhile, while the first opening is formed at the point of the frame member where the first opening intersects the first ridgeline, the pair of fixation portions of the support member are fixed to the frame member at the respective positions which correspond to the both-side positions of the first opening in the direction along the first ridgeline and to the vertical both-side positions of the first ridgeline. Accordingly, deterioration of the load-transmission function of the frame member in the vehicle side collision can be suppressed.

In another embodiment of the present invention, the support member further has a holding portion which has a second opening facing the first opening of the frame member and holds the rotational support axis in a state where the support member encloses an outer periphery of the rotational support axis, the pair of fixation portions are connected to both sides of the holding portion such that the fixation portions interpose the holding portion therebetween, and the harness is connected to the rotational support axis in a state where the harness is inserted into the first opening and the second opening.

According to this embodiment, since the holding portion of the support member holds the rotational support axis and the pair of fixation portions connected to the both sides of the holding portion are fixed to the frame member, the rotational support axis can be held stably. Further, since the harness is connected to the rotational support axis in the state where the harness is inserted into the first opening of the frame member and the second opening of the holding portion, the state where the harness is connected to the rotational support axis can be maintained even while the door-mirror body portion and the mirror base are rotated.

In another embodiment of the present invention, the support member further has a rib which connects the holding portion and the fixation portion.

According to this embodiment, since the rib connecting the holding portion and the fixation portion is provided at the support member, the support rigidity of the mirror unit can be improved and the deterioration of the load-transmission function of the frame member can be suppressed further.

In the above-described door mirror structure, it is preferable that the frame member be a beltline reinforcement which extends in a vehicle longitudinal direction along a beltline of a window lower-end edge of the side door.

According to this structure, the above-described door mirror structure can be widely used at the conventional door structure by fixing the mirror unit to the beltline reinforcement which is generally used at the conventional door structure.

In the above-described door mirror structure, it is preferable that the support member be made of aluminum dicast.

According to this structure, since the aluminum dicast can make the support member having the sufficient thickness easily and properly, the support member having the high rigidity can be manufactured properly.

In the above-described door mirror structure, it is preferable that the rotational support axis be fixed to the base-end portion of the mirror base and configured to be rotatable around the axis line of the rotational support axis together with the mirror base by receiving a rotational drive force of the electromotive rotational unit.

According to this structure, since the mirror base can be rotated by rotating the rotational support axis by means of the rotational drive force of the electromotive rotational unit, the door mirror structure is made properly simple.

In the above-described door mirror structure, the frame member may have a first ridgeline which is positioned at an outward side, in the vehicle width direction, of the frame member and extends in a vehicle longitudinal direction, and the support member may be fixed to the frame member at respective positions which correspond to vertical both-side positions of the first ridgeline.

According to this structure, since the frame member has the first ridgeline positioned on the outward side, in the vehicle width direction, of the frame member and extending in the vehicle longitudinal direction, a portion of the frame member which is located along the first ridgeline has the rigidity. Since the support member is fixed to the frame member at the respective positions which correspond to the vertical both-side positions of the first ridgeline, the support rigidity of the mirror unit is improved.

Thus, according to the door mirror structure of the above-described present invention, the effective suppression of the vibrations of the mirror during the vehicle traveling and the improvement of the visibility from the cabin inside can be compatibly attained.

The present invention will become apparent from the following description which refers to the accompanying drawings.

DETAILED DESCRIPTION OF THE INVENTION

Hereafter, a preferable embodiment of the present invention will be described referring to the accompanying drawings.

Figure 1:
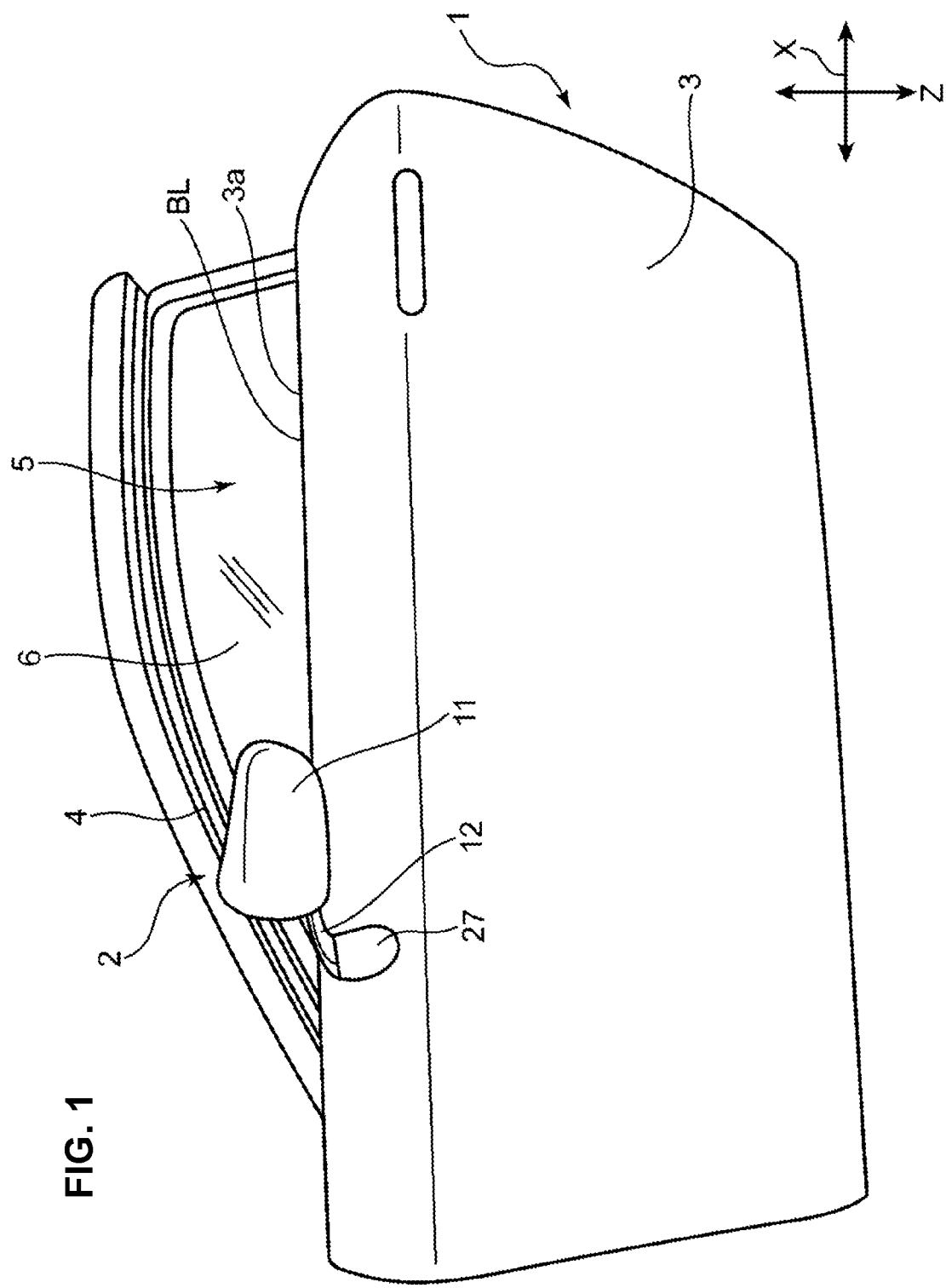
FIG. 1 is a perspective view showing a whole structure of a side door with a door mirror to which a door mirror structure according to an embodiment of the present invention is applied.
Figure 2:
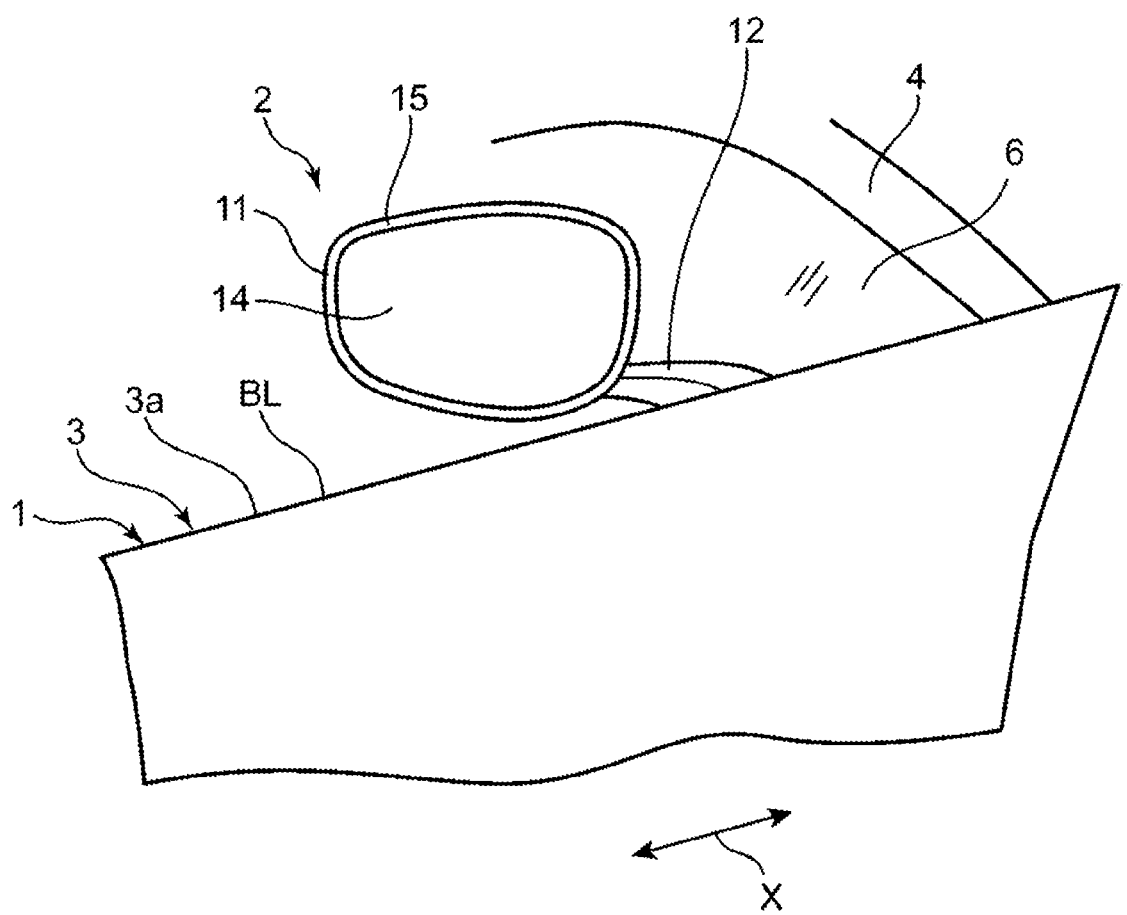
FIG. 2 is a view of the door mirror shown in FIG. 1, when viewed from a cabin inside.
Figure 3:
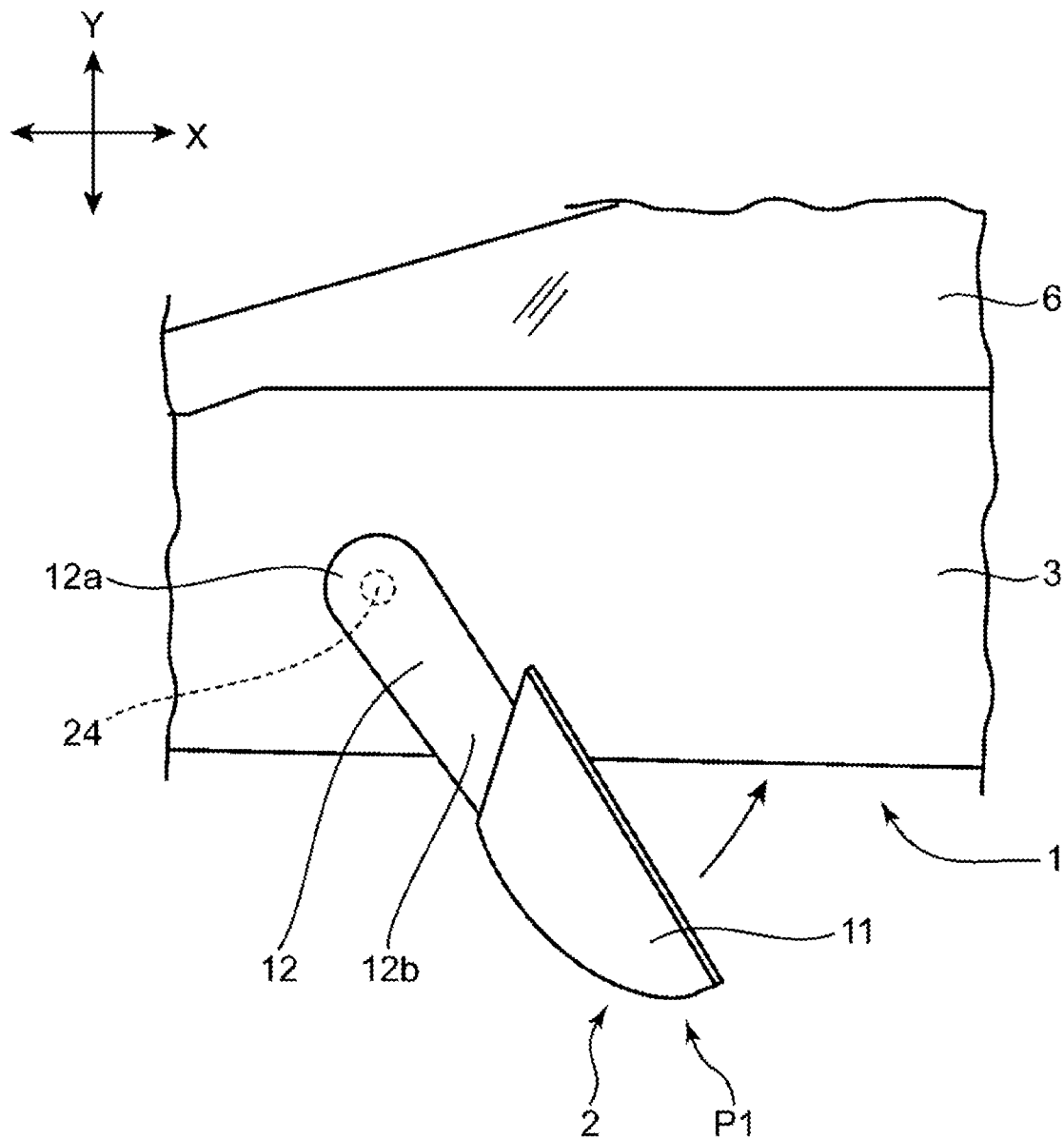
FIG. 3 is a plan view showing a state where the door mirror shown in FIG. 1 takes its use position.
Figure 4:
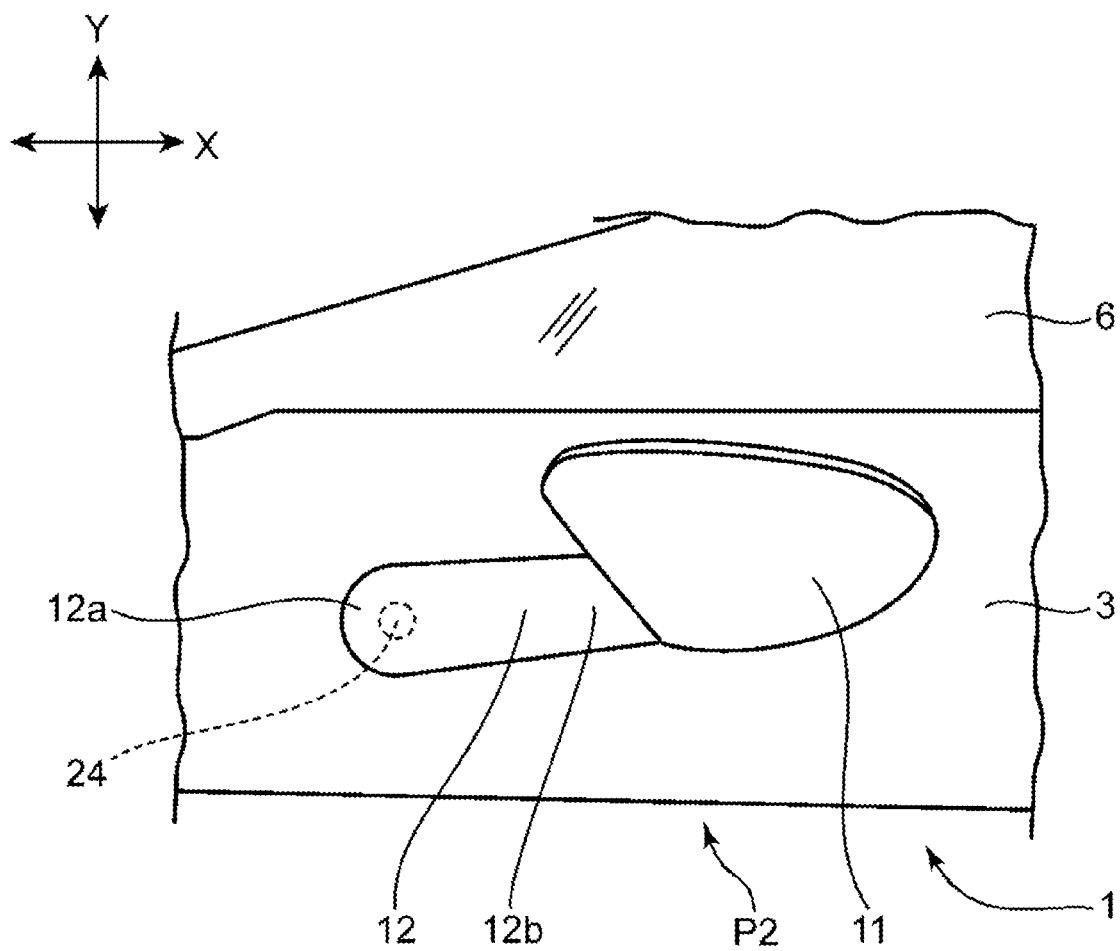
FIG. 4 is a plan view showing a state where the door mirror shown in FIG. 1 takes its storage position.
Figure 5:
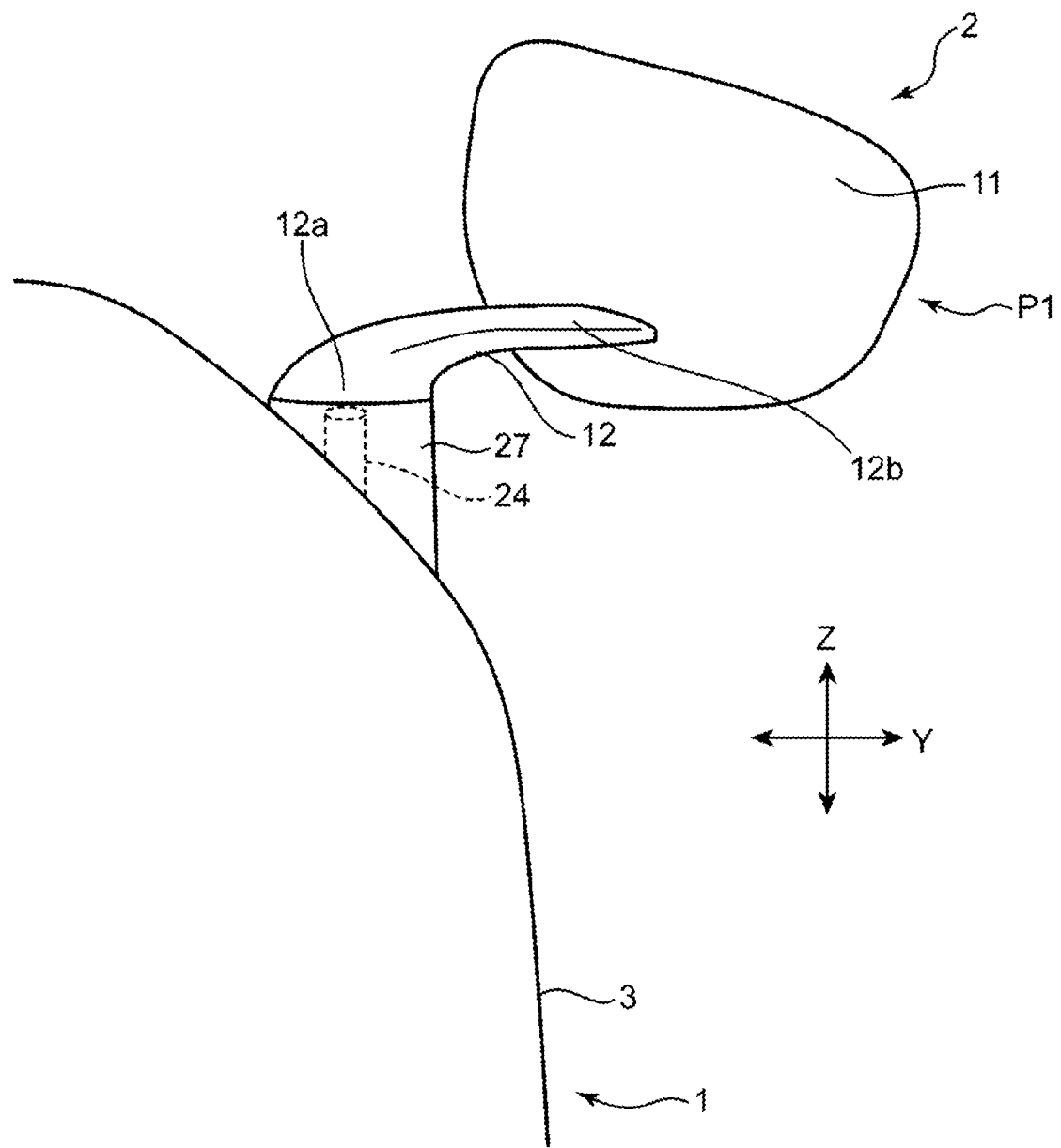
FIG. 5 is a view showing the state where the door mirror shown in FIG. 1 takes its use position, when viewed from a vehicle forward side.
Figure 6:
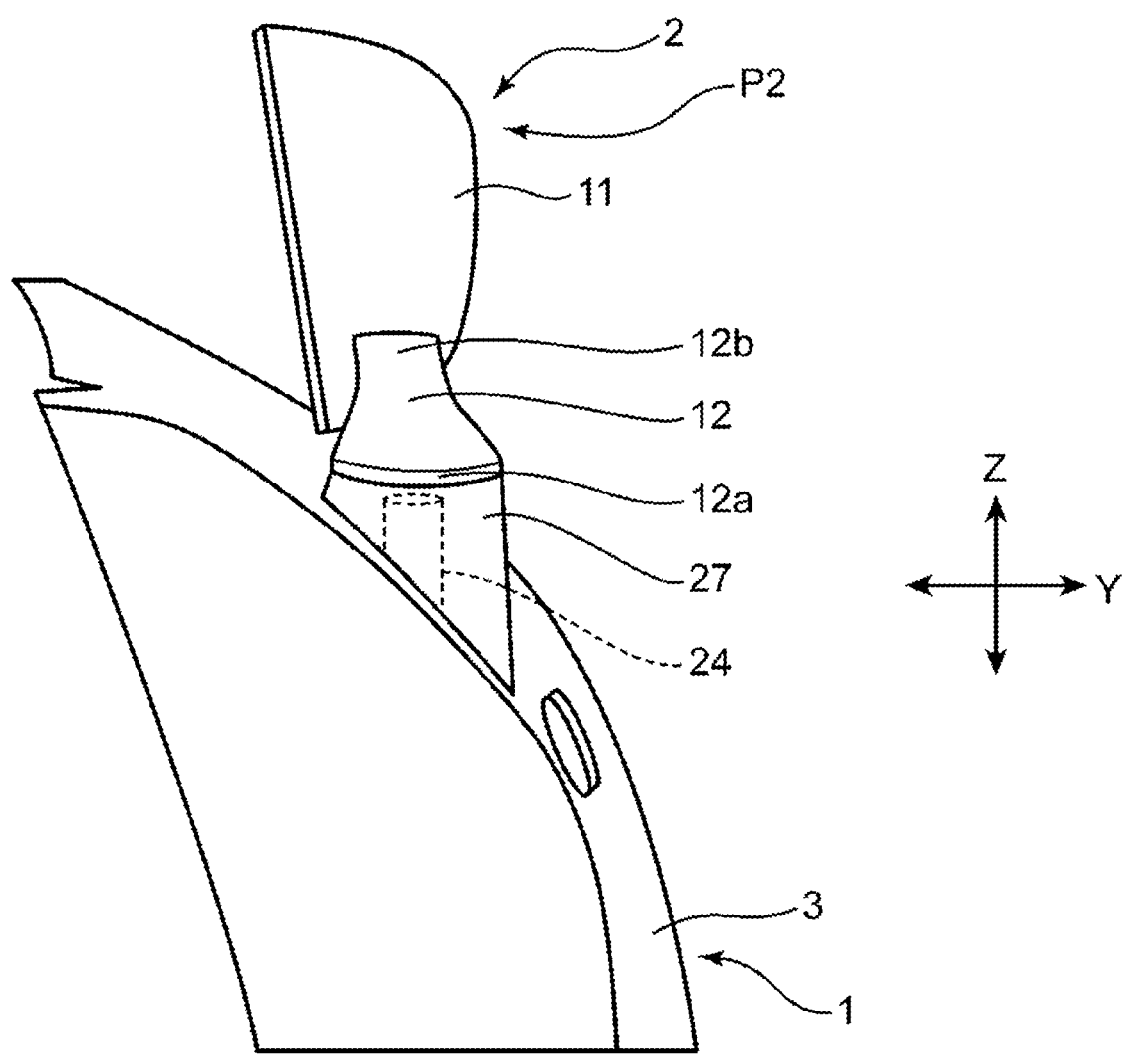
FIG. 6 is a view showing the state where the door mirror shown in FIG. 1 takes its storage position, when viewed from the vehicle forward side.

FIGS. 1 and 2 show a side door 1 of a vehicle to which a door mirror structure of the present invention is applied. The side door 1 is configured such that a door mirror 2 is arranged near a beltline BL at an upper end 3a of a door panel 3 and on a vehicle rearward side of an A pillar 4. A door glass 6 is arranged at a door opening portion 5 which is enclosed by the A pillar 4 and the beltline BL.

The door mirror structure of the side door 1 of the vehicle according to the present embodiment is the one where the door mirror 2 which is storable in an electromotive manner is attached to the side door 1 as shown in FIGS. 1-7. Specifically, the door mirror structure primarily comprises a mirror unit 16 including the door mirror 2, a beltline reinforcement 21 as a frame member which is provided inside the side door 1, and a support member 22 which fixes the mirror unit 16 to the beltline reinforcement 21.

The mirror unit 16 comprises a door-mirror base portion 11 and a mirror base 12 which constitute the door mirror 2, a rotational support axis 24 (see FIGS. 12-13) which rotatably support the door-mirror body portion 11 and the mirror base 12 between a mirror-use position P1 and a mirror-storage position P2, and an electromotive rotational unit 13 for rotating of the door-mirror body portion 11 and the mirror base 12. The electromotive rotational unit 13 is arranged inside the side door 1.

Further, the door mirror structure of the present embodiment comprises a cover member 27 which is provided at a vehicle outside of the side door 1.

Hereafter, respective structural elements of the door mirror structure will be described. First, the structural elements of the mirror unit 16 (the door-mirror body portion 11, the mirror base 12, the rotational support axis 24, and the electromotive rotational unit 13) will be described.

As shown in FIG. 2, the door-mirror body portion 11 is provided with a mirror 14 to obtain a rearward visual field of the vehicle and a housing 15. The mirror 14, which is an optical mirror to reflect light, is held at a rearward face (specifically, a face which is directed toward a vehicle rearward side in a state where the mirror 14 takes the mirror-use position P1 shown in FIG. 3) of the housing 15. Further, inside the housing 15 of the door-mirror body portion 11 are stored an inner device 37 (see FIG. 13), such as a mirror-face adjusting unit for angle adjusting of a vertical direction Z and a vehicle width direction Y of the mirror 14 or a defrosting unit for the mirror 14.

The mirror base 12, which is a section to constitute an arm portion of the door mirror 2, comprises a tip-end portion 12b which is fixed to the door-mirror body portion 11 and a base-end portion 12a which is provided away from the tip-end portion 12b as shown in FIGS. 3-6.

Further specifically, the door-mirror body portion 11 is fixed to the tip-end portion 12b of the mirror base 12 such that the mirror 14 and the mirror base 12 are nearly parallel to each other.

The base-end portion 12a of the mirror base 12 is attached to the rotational support axis 24 such that the door-mirror body portion 11 and the mirror base 12 are rotatable between the mirror-use position P1 where the mirror is visible from the cabin inside and the mirror-storage position P2 which is located on the inward side, in the vehicle width direction Y, of the mirror-use position P1.

Figure 12:
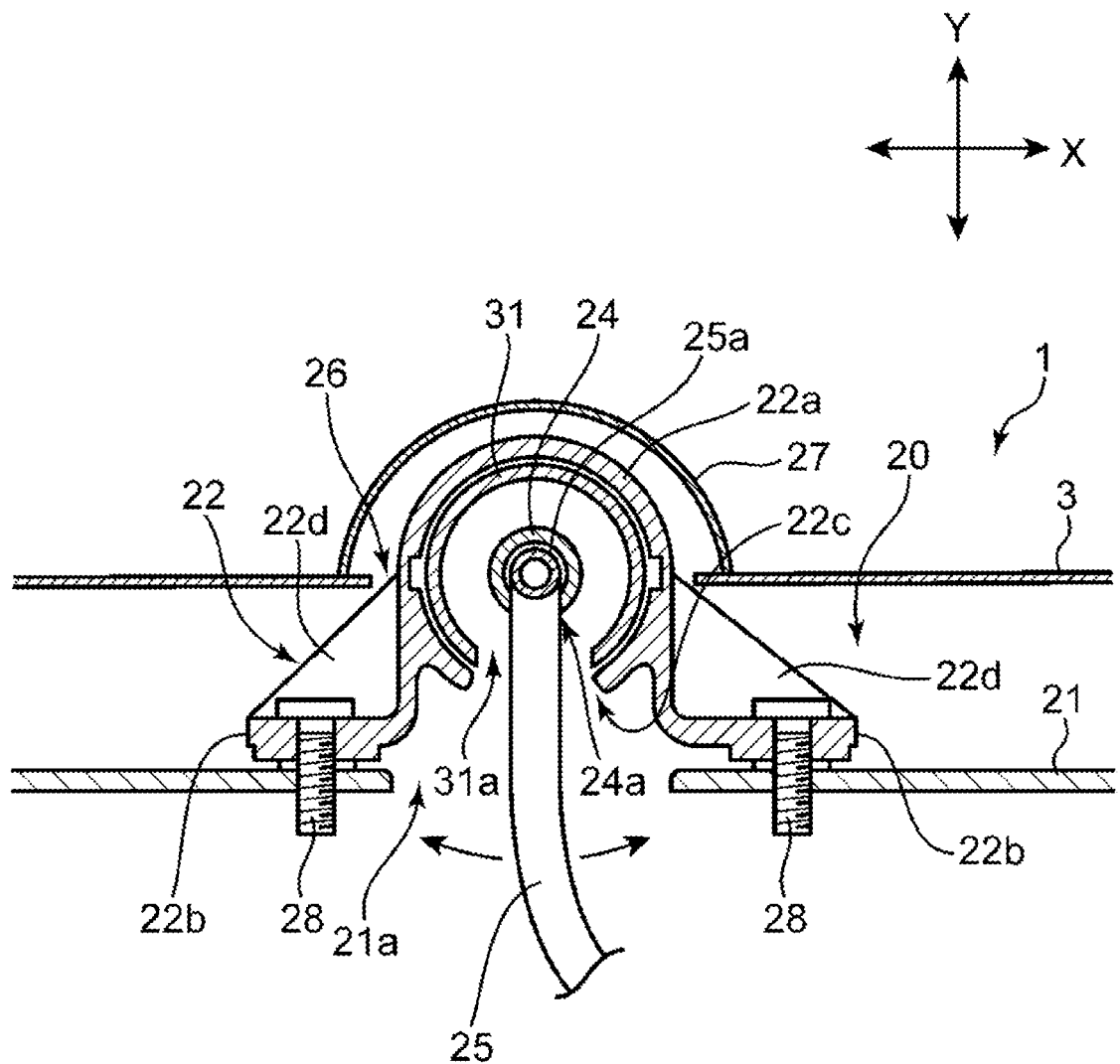
FIG. 12 is a sectional view taken along line XII-XII of FIG. 8.
Figure 13:
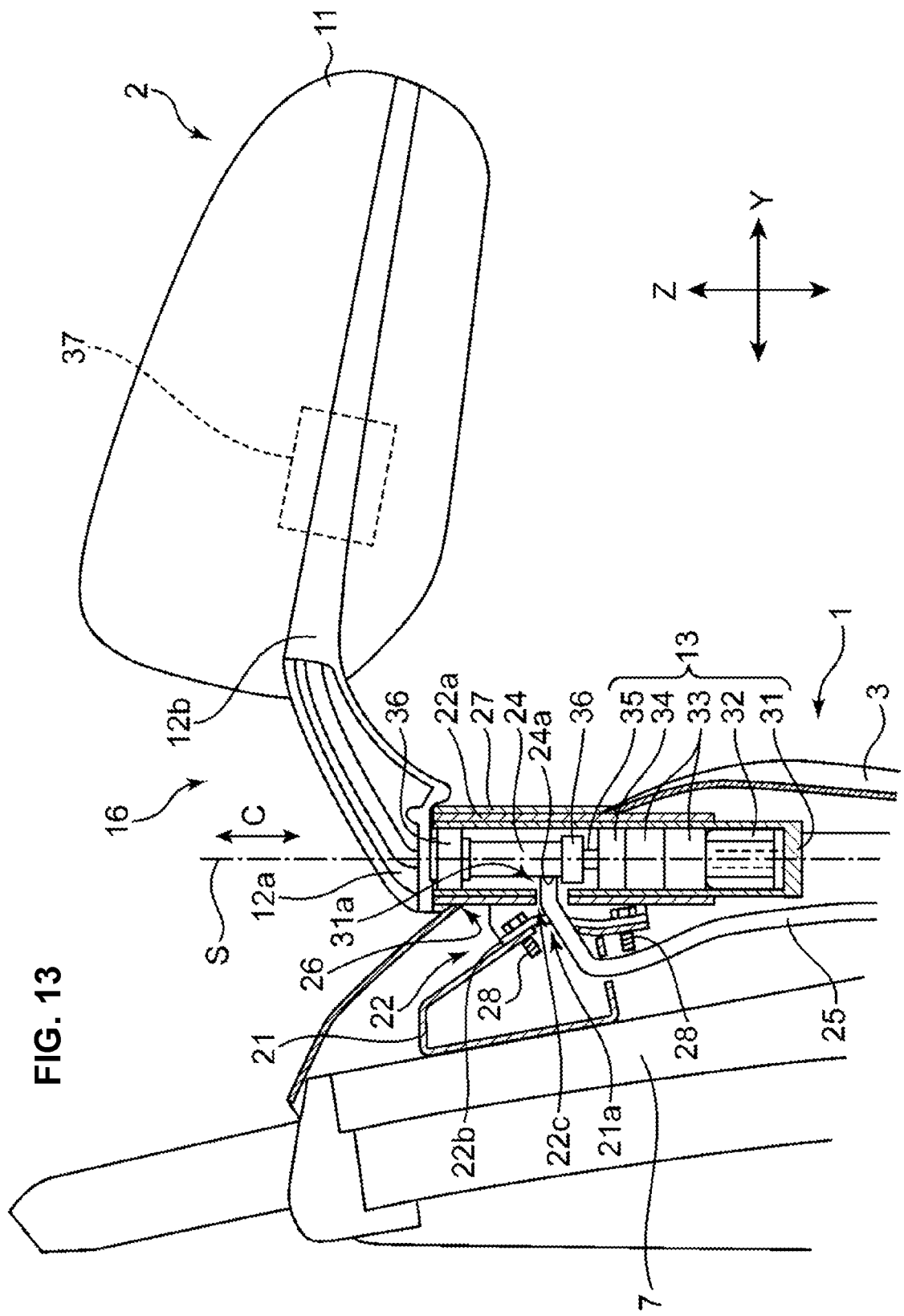
FIG. 13 is a sectional view taken along line XIII-XIII of FIG. 8, where the cover member is added.

In the present embodiment, the rotational support axis 24 shown in FIGS. 10-13 is connected to the base-end portion 12a of the mirror base 12 and fixed to the base-end portion 12a. Thereby, the rotational support axis 24 rotatably supports the door-mirror body portion 11 and the mirror base 12 around an axis line S of the rotational support axis 24 between the mirror-use position P1 (see FIGS. 3 and 5) and the mirror-storage position P2 (see FIGS. 4 and 6). As shown in FIG. 13, the rotational support axis 24 is provided to pass between the support member 22 and the beltline reinforcement 21.

The rotational support axis 24 extends from the base-end portion 12a into the side door 1 and is rotated by the electromotive rotational unit 13.

Specifically, as shown in FIGS. 10-13, a penetration hole 26 is formed at the door panel 3 (outer panel) which constitutes an outside face of the side door 1. The rotational support axis 24 passes through the penetration hole 26 of the door panel 3 and is coaxially connected to an output axis 35 (see FIG. 13) described later of the electromotive rotational unit 13 which is arranged in a space portion 20 inside the side door 1.

The electromotive rotational unit 13 is configured to rotate the door-mirror body portion 11 and the mirror base 12 between the mirror-use position P1 and the mirror-storage position P2. Specifically, the electromotive rotational unit 13 comprises, as shown in FIG. 13, a casing 31, a motor 32, a reduction gear 33 to reduce a generation torque of the motor 32, a torque limiter 34, and the output axis 35 to output a rotational drive force. The casing 31 stores the motor 32, the reduction gear 33, the torque limiter 34, and the output axis 35 therein. Further, the rotational support axis 24 and a journal 36 to rotationally support the rotational support axis 24 are also stored in the casing 31. Accordingly, the motor 32, the reduction gear 33, the torque limiter 34, and the output axis 35, which are primary structural elements of the electromotive rotational unit 13, are arranged on the axis line of the rotational support axis 24. The output axis 35 is connected to the rotational support axis 24 integrally rotationally. Thereby, the output axis 35 is rotatable around the axis line S of the rotational support axis 24 together with the mirror base 12 by receiving the rotational drive force of the electromotive rotational unit 13.

Herein, in a case where an excessive torque is generated at the rotational support axis 24 when the motor 31 is driven, the torque limiter 34 cuts transmission of the torque, so that a load of the motor 32 can be suppressed.

A ball bearing or a roller bearing which can support the rotational support axis 24 with a small rotational resistance are preferable as the journal 36.

The electromotive rotational unit 13 is fixed to the beltline reinforcement 21 by the support member 22.

Figure 7:
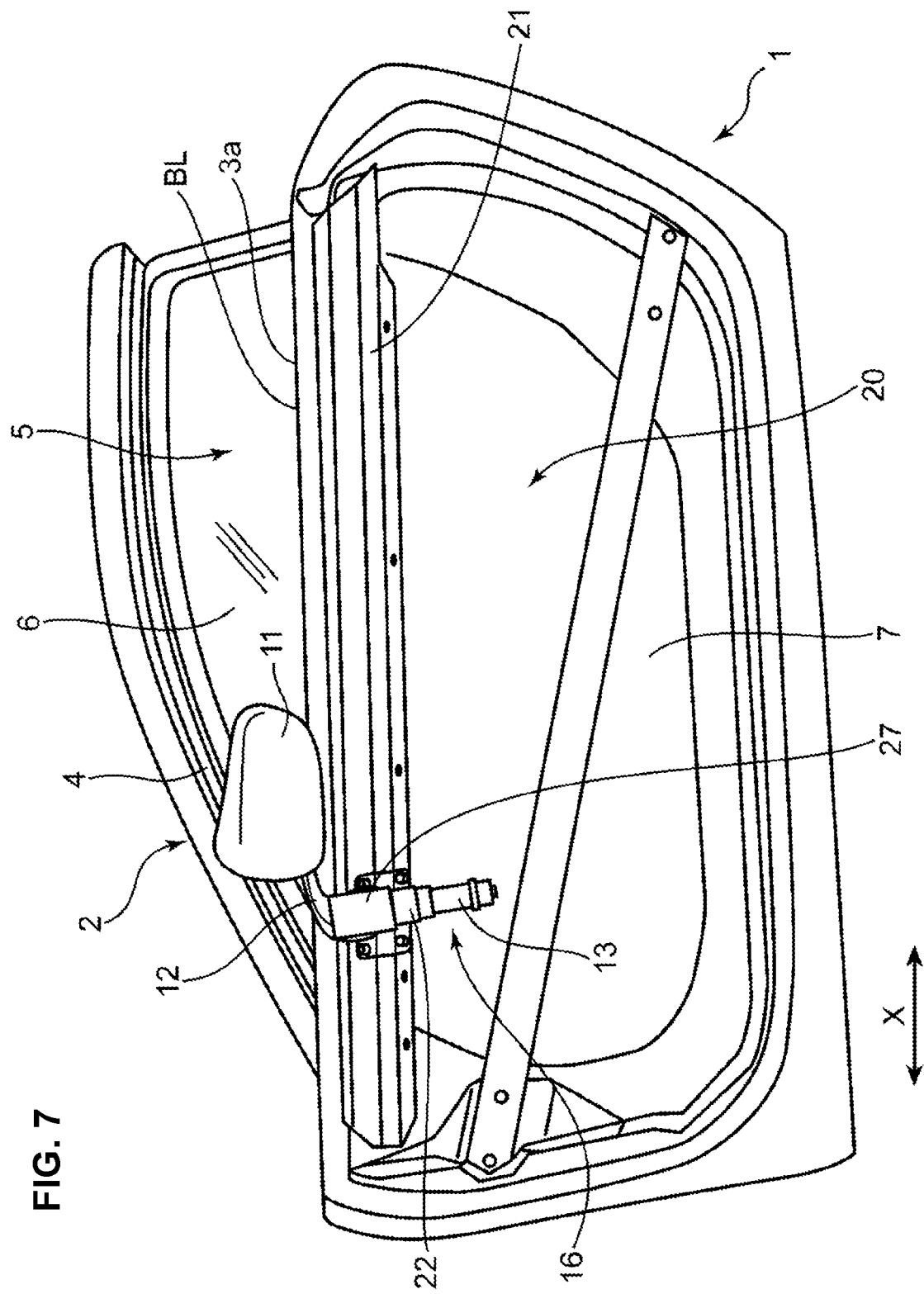
FIG. 7 is a view showing a state of the side door shown in FIG. 1 where a door outer is removed and a beltline reinforcement provided inside the side door is exposed.

The beltline reinforcement 21 is a frame member which is provided inside the side door 1 to constitute a frame of the side door 1. As shown in FIG. 7, the beltline reinforcement 21 is fixed to a door inner 7 (see FIGS. 7 and 13) provided inside the side door 1 such that it extends in the vehicle longitudinal direction X along the beltline BL at a window lower-end edge (i.e., a lower-end edge of the door opening portion 5 where the door glass 6 is arranged). The beltline reinforcement 21 of the present embodiment is made of an aluminum-made extrusion material.

As shown in FIGS. 8-11, the beltline reinforcement 21 of the present embodiment has a first ridgeline 211, a second ridgeline 212, and a third ridgeline 213 which are positioned at an outward side Y2, in the vehicle width direction, of the beltline reinforcement 21 and extend in parallel to each other in the vehicle longitudinal direction X. The first ridgeline 211 is located between the second ridgeline 212 and the third ridgeline 213 and at the most outward position of the outward side Y2, in the vehicle width direction, of the beltline reinforcement 21. That is, the first ridgeline 211 is the one which protrudes outwardly, in the vehicle width direction, the most, so that this first ridgeline 211 has the highest rigidity and thereby shows the strong property against an impact in the vehicle side collision.

Specifically, as shown in FIGS. 8 and 10-12, the support member 22 comprises a semi-cylindrical shaped holding portion 22a, a pair of fixation portions 22b which are provided at both sides, in the vehicle longitudinal direction X, of the holding portion 22a, and a pair of ribs 22d which respectively connect the holding portion 22a and the pair of fixation portions 22b. The support member 22 is made of aluminum dicast. That is, the holding portion 22a, the pair of fixation portions 22b, and the ribs 22d are formed integrally.

The holding portion 22a holds the rotational support axis 24 in a state where it encloses an outer periphery of the rotational support axis 24. Specifically, the holding portion 22a holds the rotational support axis 24 in a state where it encloses the casing 31 which stores the electromotive rotational unit 13 and the rotational support axis 24 therein.

The pair of fixation portions 22b are connected to both sides (both sides, in the vehicle longitudinal direction X) of the holding portion 22a in a state where the holding portion 22a is interposed therebetween. The pair of fixation portions 22b are fastened to the beltline reinforcement 21 by bolts 28. In the present embodiment, the pair of fixation portions 22b are fixed to the beltline reinforcement 21 at both-side positions of a first opening 21a described later. Thereby, the support member 22 can fix the mirror unit 16 to the beltline reinforcement 21.

The rib 22d is a triangular plate-shaped portion and improves the rigidity of the support member 22 by connecting the holing portion 22a and the fixation portion 22b.

Figure 14:
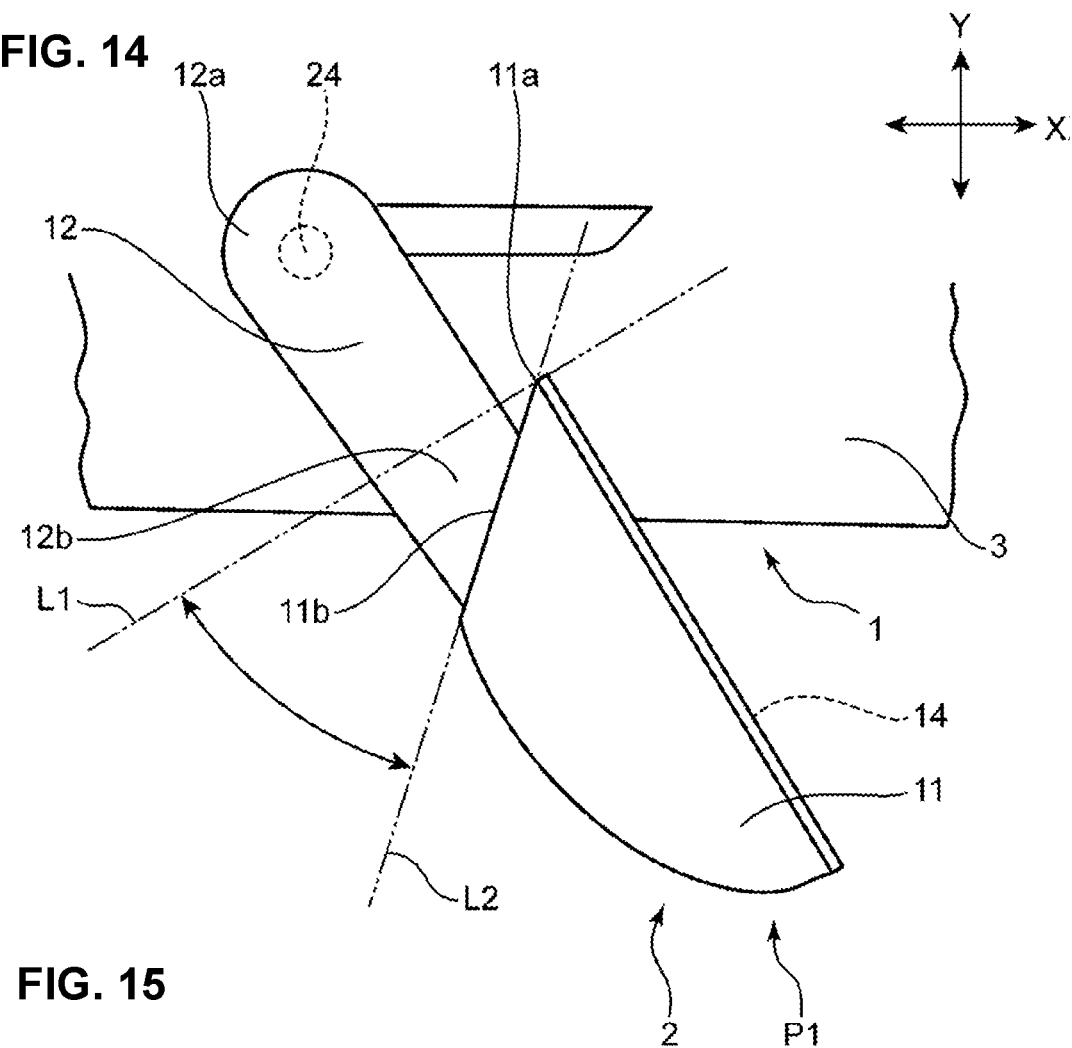
FIG. 14 is an explanatory diagram showing a state where an inner face of a door-mirror body portion is inclined toward a vehicle-outside relative to an imaginary line perpendicular to a surface of the mirror in the door mirror taking the mirror-use position shown in FIG. 3.

Further, the door structure of the present embodiment further comprises, as shown in FIG. 14, a harness 25 which is connected to a portion of the rotational support axis 24 which is located at a point where the support member 22 and the beltline reinforcement 21 overlap with each other in a direction perpendicular to an axis-line direction C of the rotational support axis 24. As shown in FIGS. 10-13, the harness 25 extends from the space portion 20 inside the side door 1 to the door-mirror body portion 11 and is electrically coupled to the inner device 37 (e.g., the mirror-face adjusting unit) provided inside the door-mirror body portion 11.

Figure 9:
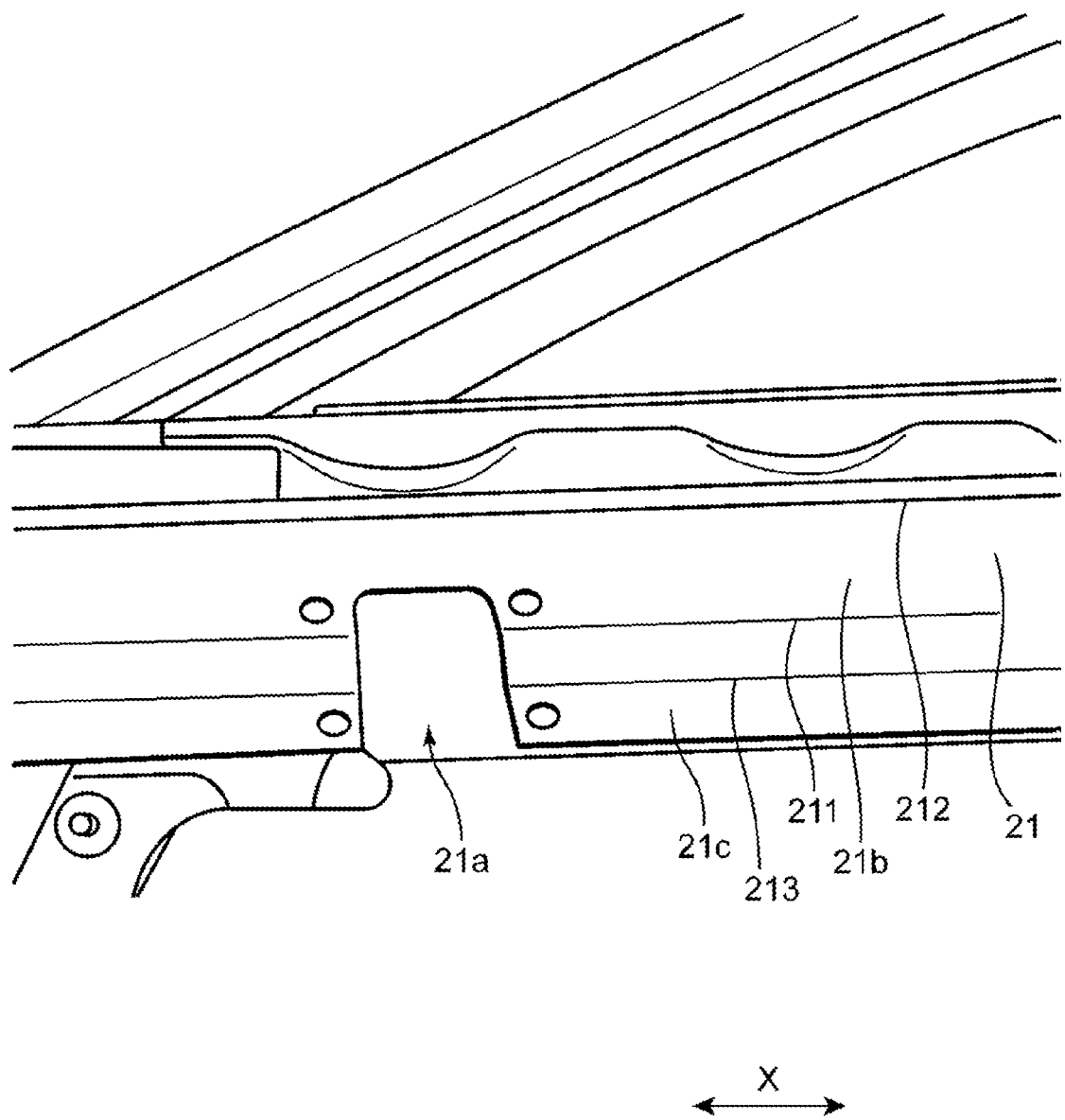
FIG. 9 is an enlarged view showing an arrangement of a first ridgeline and a first opening of the beltline reinforcement in a state where the mirror unit shown in FIG. 8 and a support member are removed.
Figure 10:
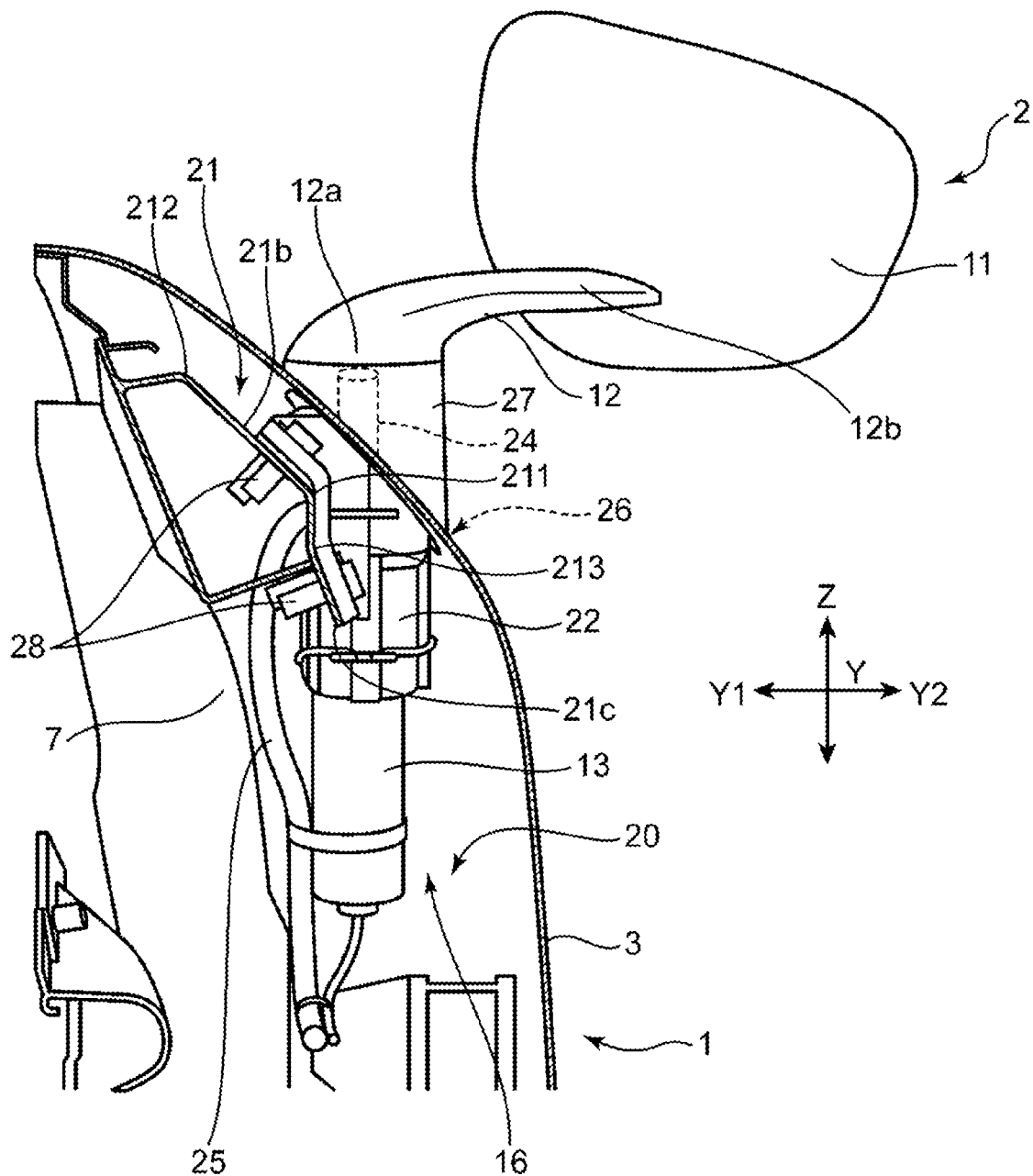
FIG. 10 is a sectional view taken along line XI-XI of FIG. 8, where a cover member is added.
Figure 11:
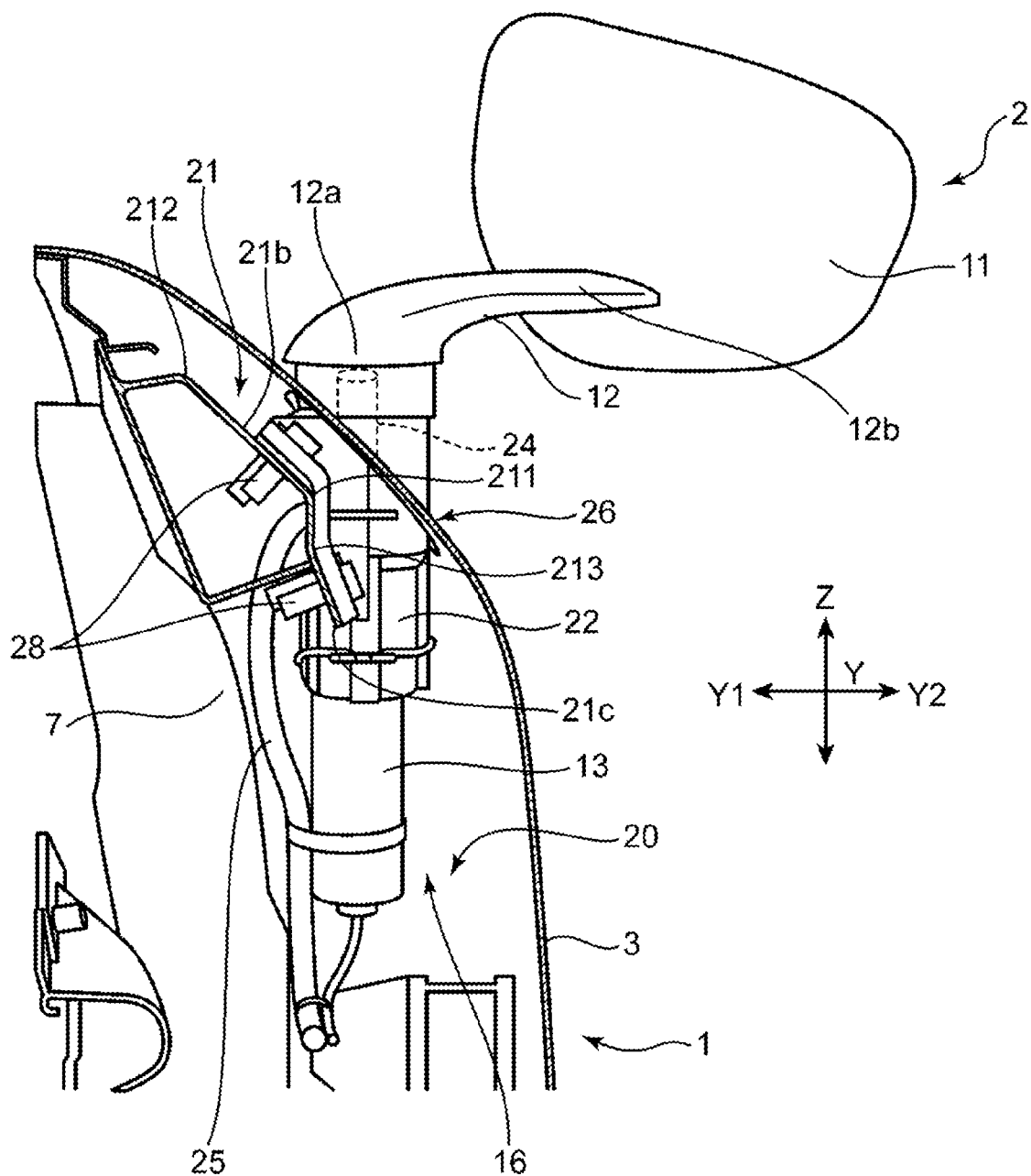
FIG. 11 is a sectional view taken along line XI-XI of FIG. 8.

Specifically, as shown in FIGS. 9, 12 and 13, the beltline reinforcement 21 has a first opening 21a where the harness 25 is inserted at a portion thereof which overlaps with the support member 22, i.e., at a position which faces the holding portion 22a of the support member 22. The first opening 21a is formed at a point where the first opening 21a intersects the first ridgeline 211.

The size of the first opening 21a is large enough to prevent the harness 25 from contacting an inner peripheral edge of the first opening 21a during the rotation of the door-mirror body portion 11 and the mirror base 12. Accordingly, as shown in FIG. 12, even when the harness 25 rotates in the vehicle longitudinal direction X together with the rotation of the rotational support axis 24, contacting of the harness with the inner peripheral edge of the first opening 21a is prevented.

The pair of fixation portions 22b of the support member 22 are fixed to the beltline reinforcement 21 at both-side positions of the first opening 21a in the direction along the first ridgeline 211 (i.e., in the vehicle longitudinal direction X) and at vertical both-side positions of the first ridgeline 211. Specifically, the pair of fixation portions 22b are fixed to an outside face of the beltline reinforcement 21 at a portion 21b which is located on an upper side of the first ridgeline 211 and a flange portion 21c which is located on a lower side of the first ridgeline 211.

The holding portion 22a has a second opening 22c which faces the first opening 21a of the beltline reinforcement 21.

Further, a third opening 31a is formed at the casing 31 of the electromotive rotational unit 13 at a position which faces the first opening 21a. Further, the rotational support axis 24 of the present embodiment is of a hollow cylindrical shape, and a fourth opening 24a is formed at its peripheral surface at a position which faces the third opening 31a.

Accordingly, the harness 25 is connected to the rotational support axis 24 in a state where the harness 25 is inserted into the first opening 21a and the second opening 22c. Specifically, the harness 25 extends from the inside of the side door 1 to the inside of the rotational support axis 24 passing through the first opening 21a of the beltline reinforcement 21, the second opening 22c of the holding portion 22a of the support member 22, the third opening 31a of the casing 31, and the fourth opening 24a of the rotational support axis 24 (see a portion 25a of the harness 25 shown in FIG. 12 which extends upwardly passing through the inside of the rotational support axis 24). Further, the harness 25 extends to the inner device 37 provided inside the door-mirror body portion 11 passing through the respective insides of the rotational support axis 24 and the mirror base 12, and is electrically coupled to the inner device 37.

Herein, in the door mirror structure of the present embodiment, since the holding portion 22a of the support member 22 is of the semi-cylindrical shape, even if the harness 25 is arranged as described above, the casing 31 can be inserted into the holding portion 22a of the support member 22 from above without any interference of the harness 25 with the holding portion 22a.

The cover member 27 is configured to cover a gap between the penetration hole 26 and the rotational support axis 24 from the vehicle outside. Specifically, as shown in FIGS. 10-13, the casing 31 of the electromotive rotational unit 13 where the rotational support axis 24 is stored and the holding portion 22a of the support member 22 which covers the casing 31 are exposed to the vehicle outside through the penetration hole 26 of the door panel 3. The cover member 27 covers the casing 31 and the holding portion 22a which store the rotational support axis 24 therein from the outside at a position located below the base-end portion 12a of the mirror base 12 and also covers a gap between the penetration hole 26 and the holding portion 22a.

Further, as shown in FIG. 14, the door-mirror body portion 11 of the present embodiment is configured such that an inner face 11b of the door-mirror body portion 11 which faces the side door 1 is inclined toward the vehicle outside relative to an imaginary line L1 which passes through an inner-end portion 11a of the door-mirror body portion 11 perpendicularly to a surface of the mirror 14 in a plan view in the mirror-use position P1 (i.e., inclined in a direction away from the side door 1) for improvement of the visibility from the cabin inside. That is, the inner face 11b of the door-mirror body portion 11 extends along an imaginary line L2 which extends obliquely relative to the imaginary line L1 toward the vehicle outside with its start point of the inner-end portion 11a of the door-mirror body portion 11. In other words, the door-mirror body portion 11 taking the mirror-use position P1 shown in FIG. 14 is configured such that the width, in the longitudinal direction X, of the door-mirror body portion 11 becomes narrower from a middle position, in the vehicle width direction Y, of the door-mirror body portion 11 toward the inner-end portion 11a which is positioned on the side of the side door 1 in the vehicle width direction Y (becomes a taper shape).

Figure 15:
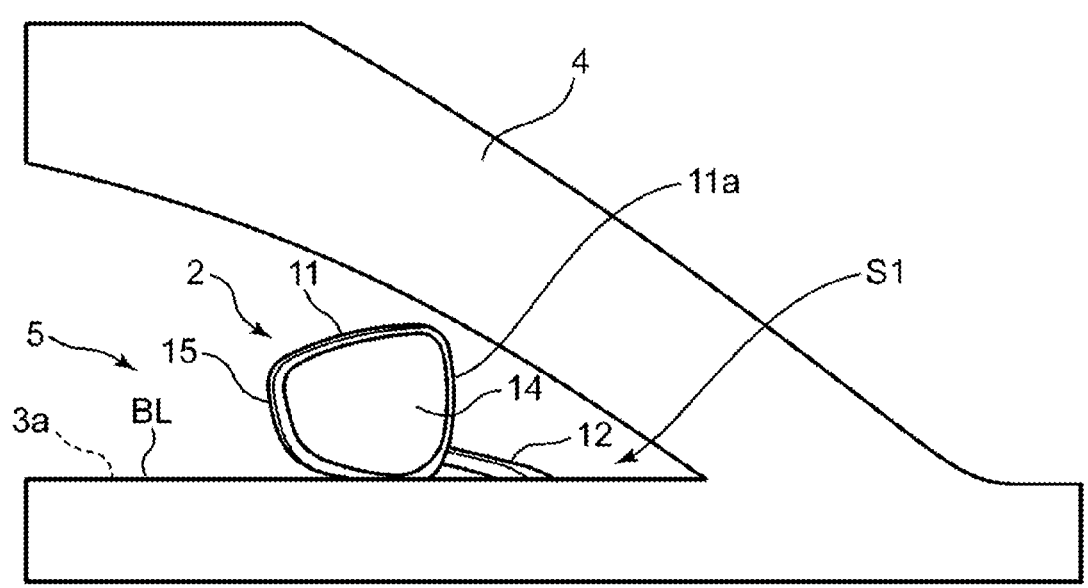
FIG. 15 is an explanatory diagram showing a state where the visibility from the cabin inside is improved because the inner face of the door-mirror body portion is not visible from the cabin inside in the door mirror taking the mirror-use position shown in FIG. 3.

By configuring (shaping) the door-mirror body portion 11 as described above, the visual field from the cabin inside is not interrupted by the inner face 11b of the door-mirror body portion 11 as shown in FIG. 15. Thereby, a visual field of a space S1 which is located in front of the door-mirror body portion 11, i.e., the space S1 which is enclosed by the inner-end portion 11a of the door-mirror body portion 11, the A pillar 4, and the beltline BL, can be secured widely, so that the visibility is improved.

Figure 16:
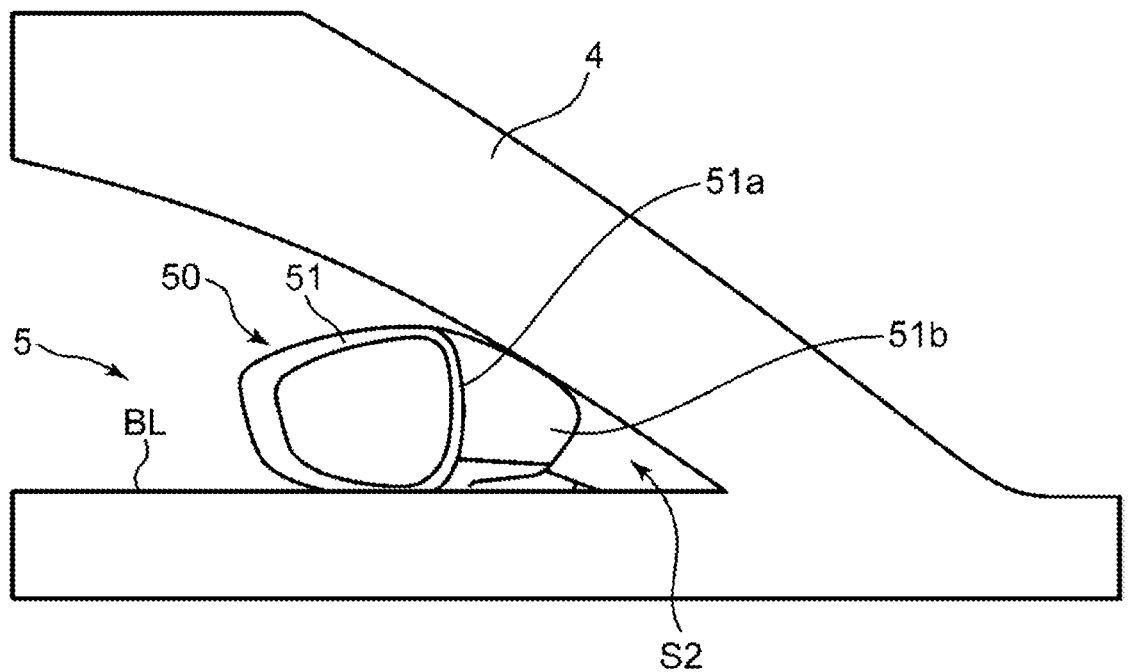
FIG. 16 is a diagram showing, as a comparative example of the present invention, a state of a conventional door mirror where since a longitudinal width of a door-mirror body portion which stores an electromotive rotational unit is large, an inner face of the door-mirror body portion is visible from the cabin inside, so that the visibility from the cabin inside is hindered.

For reference, in a structure in which the electromotive rotational unit (not illustrated) is stored at a door-mirror body portion 51 like a door mirror 50 which is shown in FIG. 16 as a comparative example, since the longitudinal width of the door-mirror body portion 51 becomes larger, an inner face 51b of the door-mirror body portion 51 becomes visible from the cabin inside. Accordingly, the space S2 which is located in front of the door-mirror-body portion 51, i.e., the space S2 which is enclosed by the inner-end portion 51a of the door-mirror body portion 51, the A pillar 4, and the beltline BL becomes narrower, so that it is apparent that the visibility is deteriorated.

Features of Present Embodiment

[1]

In the door mirror structure of the present embodiment, the door mirror structure of the side door 1 of the vehicle comprises, as shown in FIGS. 1-7, the mirror unit 16, the beltline reinforcement 21 as the frame member provided inside the side door 1, and the support member 22 fixing the mirror unit 16 to the beltline reinforcement 21.

The mirror unit 16 comprises the door-mirror body portion 11 which is provided with the mirror 14 to obtain a rearward visual field of the vehicle, the mirror base 12 which has the tip-end portion 12b fixed to the door-mirror body portion 11 and the base-end portion 12a provided away from the tip-end portion 12b, the rotational support axis 24 (see FIGS. 12 and 13) which is connected to the base-end portion 12a of the mirror base 12 and rotatably supports the door-mirror body portion 11 and the mirror base 12 between the mirror-use position P1 where the mirror 14 is visible from the cabin inside and the mirror-storage position P2 which is located on the inward side, in the vehicle width direction Y, of the mirror-use position P1, and the electromotive rotational unit 13 which rotates the door-mirror body portion 11 and the mirror base 12 between the mirror-use position P1 and the mirror-storage position P2 by the rotation around the axis line S of the rotational support axis 24. The electromotive rotational unit 13 is provided inside the side door 1.

According to this structure, since the electromotive rotational unit 13, which is a heavy object in the mirror unit 16, is provided inside the side door 1 in the door mirror structure provided with the mirror unit 16 comprising the door-mirror body portion 11, the mirror base 12, the rotational support axis 24, and the electromotive rotational unit 11 to rotate the door-mirror body portion 11 and the mirror base 12 around the axis line S of the rotational support axis 24, the vertical moment generated at the door mirror 2 which is caused by a road-surface input during the vehicle traveling (i.e., vibrations or outer forces which are mainly generated in the vertical direction, which may be caused by an unevenness (concave/convex) of the road surface) can be decreased, so that the vibrations of the mirror 14 can be suppressed. Further, the support rigidity of the mirror unit 16 is improved by the support member 22 fixing the mirror unit 16, including the electromotive rotational unit 13, to the beltline reinforcement 21, so that the vibrations of the mirror 14 can be suppressed effectively.

Moreover, since the electromotive rotational unit 13 is provided inside the side door 1, the longitudinal width of the door-mirror body portion 11 can be shortened compared with a conventional door-mirror structure in which the electromotive rotational unit 13 is stored inside the door-mirror body portion 11, so that the visibility from the cabin inside can be improved.

Further, in the above-described structure, the electromotive rotational unit 13 moves the door-mirror body portion 11 and the mirror base 12 from the mirror-use position P1 to the mirror-storage position P2. Accordingly, in the state where the door-mirror body portion 11 and the mirror base 12 are rotated to the mirror-storage position P2, the respective protrusion quantities of the door-mirror body portion 11 and the mirror base 12 which protrude from the side face of the side door 1 can be made small, so that the vehicle width can be properly minimized.

[2]

In the door mirror structure of the present embodiment, as shown in FIG. 13, the rotational support axis 24 is provided to pass between the support member 22 and the beltline reinforcement 21. The door mirror structure further comprises the harness 25 which is connected to the portion of the rotational support axis 24 which is located at the point where the support member 22 and the beltline reinforcement 21 overlap with each other in the direction perpendicular to the axis-line direction C of the rotational support axis 24. The beltline reinforcement 21 has, as shown in FIGS. 9, 12 and 13, the first opening 21a where the harness 25 is inserted at the portion thereof which overlaps with the support member 22. The size of the first opening 21a is large enough to prevent the harness 25 from contacting the inner peripheral edge of the first opening 21a during the rotation of the door-mirror body portion 11 and the mirror base 12. The support member 22 has a pair of fixation portions 22b which are fixed to the beltline reinforcement 21 at the both-side positions of the first opening 21a.

According to this structure, since the size of the first opening 21a is large enough to prevent the harness 25 from contacting the inner peripheral edge of the first opening 21a during the rotation of the door-mirror body portion 11 and the mirror base 12 in the structure in which the harness 25 connected to the rotational support axis 24 is inserted into the first opening 21a of the beltline reinforcement 21, improper contacting of the harness 25 connected to the rotational support axis 24 with the inner peripheral edge of the first opening 21a of the beltline reinforcement 21 is suppressed even if the harness 25 is rotated in the vehicle longitudinal direction X together with the rotation of the rotational support axis 24 as shown in FIG. 12 when the electromotive rotational unit 13 is operated. Moreover, the load-transmission function (specifically, the load-transmission function in the vehicle longitudinal direction X) is assisted by the pair of fixation portions 22b of the support member 22 which are fixed to the both-side positions of the first opening 21a, so that the load-transmission function of the beltline reinforcement 21 in the vehicle side collision can be suppressed from being deteriorated.

[3]

In the door mirror structure of the present embodiment, as shown in FIGS. 8-11, the beltline reinforcement 21 has the first ridgeline 211 which is positioned at the outward side Y2, in the vehicle width direction, of the beltline reinforcement 21 and extends in the vehicle longitudinal direction X. The first opening 21a is formed at the point where the first opening 21a intersects the first ridgeline 211. The pair of fixation portions 22b of the support member 22 are fixed to the beltline reinforcement 21 at the respective positions which correspond to the both-side positions of the first opening 21a in the direction along the first ridgeline 211 and to the vertical both-side positions of the first ridgeline 211.

According to this structure, since the beltline reinforcement 21 has the first ridgeline 211 which is positioned on the outward side Y2, in the vehicle width direction, of the beltline reinforcement 21 and extends in the vehicle longitudinal direction X, the rigidity of the portion of the beltline reinforcement 21 along the first ridgeline 211 (i.e., the portion of the first ridgeline 211 which protrudes toward the outward side Y2, in the vehicle width direction, of the beltline reinforcement 21) is increased. Since the pair of fixation portions 22b of the support member 22 are fixed to the beltline reinforcement 21 at the respective positions which correspond to the vertical both-side positions of the first ridgeline 211, the support rigidity of the mirror unit 16 is improved. Meanwhile, while the first opening 21a is formed at the point of the beltline reinforcement 21 where the first opening 21a intersects the first ridgeline 211, the pair of fixation portions 22b of the beltline reinforcement 22 are fixed to the beltline reinforcement 21 at the respective positions which correspond to the both-side positions of the first opening 21a in the direction along the first ridgeline 211 and to the vertical both-side positions of the first ridgeline 211. Accordingly, deterioration of the load-transmission function of the beltline reinforcement 21 in the vehicle side collision can be suppressed.

[4]

In the door mirror structure of the present embodiment, as shown in FIGS. 12 and 13, the support member 22 further has the holding portion 22a which holds the rotational support axis 24 in a state where the support member 22 encloses the outer periphery of the rotational support axis 24. The holding portion 22a has the second opening 22c which faces the first opening 21a of the beltline reinforcement 21. The pair of fixation portions 22b are connected to the both sides of the holding portion 22a such that the fixation portions 22b interpose the holding portion 22a therebetween. The harness 25 is connected to the rotational support axis 24 in a state where the harness 25 is inserted into the first opening 21a and the second opening 22c.

According to this structure, since the holding portion 22a of the support member 22 holds the rotational support axis 24 and the pair of fixation portions 22b connected to the both sides of the holding portion 22a are fixed to the beltline reinforcement 21, the rotational support axis 24 can be held stably. Further, since the harness 25 is connected to the rotational support axis 24 in the state where the harness 25 is inserted into the first opening 21a of the beltline reinforcement 21 and the second opening 22c of the holding portion 22a, the state where the harness 25 is connected to the rotational support axis 24 can be maintained even while the door-mirror body portion 11 and the mirror base 12 are rotated.

[5]

Figure 8:
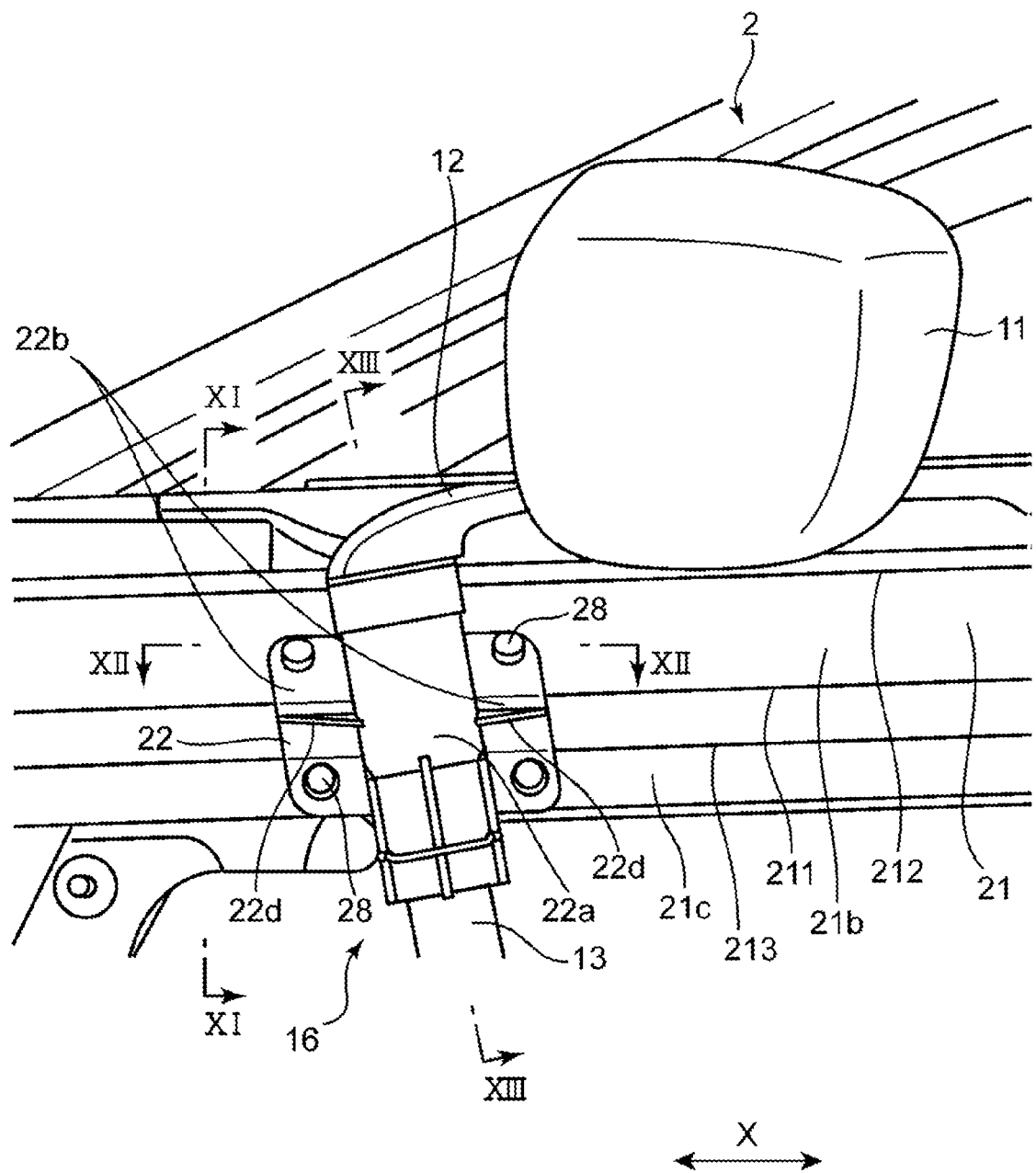
FIG. 8 is an enlarged view showing a state where a mirror unit is fixed to the beltline reinforcement shown in FIG. 7.

In the door mirror structure of the present embodiment, as shown in FIGS. 8 and 12, the support member 22 further has the rib 22d which connects the holding portion 22a and the fixation portion 22b. According to this structure, since the rib 22d connecting the holding portion 22a and the fixation portion 22d is provided at the support member 2, the support rigidity of the mirror unit 16 can be improved and the deterioration of the load-transmission function of the beltline reinforcement 21 can be suppressed further.

[6]

In the door mirror structure of the present embodiment, the beltline reinforcement 21 which extends in the vehicle longitudinal direction X along the beltline BL of the window lower-end edge of the side door 1 is adopted as the frame member.

According to this structure, the above-described door mirror structure can be widely used at the conventional door structure by fixing the mirror unit 16 to the beltline reinforcement 21 which is generally used at the conventional door structure.

[7]

In the door mirror structure of the present embodiment, the support member 22 is made of aluminum dicast. According to this structure, since the aluminum dicast can make the support member 22 having the sufficient thickness easily and properly, the support member 22 having the high rigidity can be manufactured properly. Moreover, since the aluminum-dicast made support member 22 has the high rigidity, the superior vibration-suppression effect can be obtained.

[8]

In the door mirror structure of the present embodiment, as shown in FIG. 13, the rotational support axis 24 is fixed to the base-end portion 12a of the mirror base 12 and configured to be rotatable around the axis line S of the rotational support axis 24 together with the mirror base 12 by receiving the rotational drive force of the electromotive rotational unit 13.

According to this structure, since the mirror base 12 can be rotated by rotating the rotational support axis 24 by means of the rotational drive force of the electromotive rotational unit 13, the door mirror structure is made properly simple.

[9]

In the door mirror structure of the present embodiment, the electromotive rotational unit 13 is arranged inside the side door 1. Accordingly, the electromotive rotational unit 13 can be protected from a foreign substance or the like which exist in the vehicle outside by the door panel 3 constituting the outside face of the side door 1. Herein, the electromotive rotational unit 13 may be positioned outside of the side door 1, but in this case, a large cover member to protect the electromotive rotational unit 13 or the like are required.

[10]

In the door mirror structure of the present embodiment, the electromotive rotational unit 13 (specifically, the motor 32, the reduction gear 33, the torque limiter 34, and the output axis 35, which are primary structural elements of the electromotive rotational unit 13) is arranged on the axis line of the rotational support axis 24.

According to this structure, since the electromotive rotational unit 13 is arranged on the axis line of the rotational support axis 24, a system structure of drive-force transmission from the electromotive rotational unit 13 to the rotational support axis 24 can be made simple and compact. Thereby, arranging the electromotive rotational unit 13 in the space inside the side door 1 becomes possible.

[11]

In the door mirror structure of the present embodiment, the penetration hole 26 where the rotational support axis 24 passes is formed at the door panel 3 which constitutes the outside face of the side door 1. The door mirror structure further comprises the cover member 27 which covers the gap between the penetration hole 26 and the rotational support axis 24.

According to this structure, since the cover member 27 covers the gap between the penetration hole 26 and the rotational support axis 24, appearance of the vehicle is improved and also water can be prevented from coming into the inside of the door panel 3 through the above-described gap.

[12]

In the door mirror structure of the present embodiment, the beltline reinforcement 21 is made of an aluminum-made extrusion material.

According to this structure, since the beltline reinforcement 21 is made of the aluminum-made extrusion material, securement of the support rigidity of the electromotive rotational unit 13 and light weight of the vehicle can be compatibly attained.

[13]

In the door mirror structure of the present embodiment, as shown in FIG. 14, the door-mirror body portion 11 is configured such that the inner face 11b of the door-mirror body portion 11 which faces the side door 1 is inclined toward the vehicle outside relative to the imaginary line L1 which passes through the inner-end portion 11a of the door-mirror body portion 11 perpendicularly to the surface of the mirror 14 in the plan view in the mirror-use position P1.

Accordingly, since the door-mirror body portion is configured such that the inner face 11b of the door-mirror body portion 11 is inclined toward the vehicle outside relative to the imaginary line L1 perpendicular to the surface of the mirror 14 taking the mirror-use position P1, the visual field from the cabin inside is not interrupted by the inner face 11b of the door-mirror body portion 11. Consequently, the visibility from the cabin inside is secured at the maximum, thereby improving the visibility further.

[14]

In the door mirror structure of the present embodiment, as shown in FIG. 14, the door-mirror body portion 11 taking the mirror-use position P1 is configured such that the width, in the longitudinal direction X, of the door-mirror body portion 11 becomes narrower from the middle position, in the vehicle width direction Y, of the door-mirror body portion 11 toward the inner-end portion 11a which is positioned on the side of the side door 1 in the vehicle width direction Y.

According to this structure, since the door-mirror body portion 11 taking the mirror-use position P1 is configured such that the width, in the longitudinal direction X, of the door-mirror body portion 11 becomes narrower from the middle position, in the vehicle width direction Y, of the door-mirror body portion 11 toward the inner-end portion 11a in the vehicle width direction Y, the visual filed from the cabin inside is not interrupted by the inner face 11b of the door-mirror body portion 11. Consequently, the visibility from the cabin inside is secured at the maximum, thereby improving the visibility further.

MODIFIED EXAMPLES

[A]

While the present embodiment is configured such that the rotational support axis 24 is fixed to the base-end portion 12a of the mirror base 12 and rotatable around the axis line S of the rotational support axis 24 together with the mirror base 12 by receiving the rotational drive force of the electromotive rotational unit 13, the present invention is not limited to this structure. The present invention is attained as long as the rotational support axis 24 is connected to the base-end portion 12a and the electromotive rotational unit 13 rotates the door-mirror body portion 11 and the mirror base 12 around the axis line S of the rotational support axis 24. Accordingly, there may be a modified example of the present invention, in which the rotational support axis 24 is provided as a non-rotational axis, the base-end portion 12a of the mirror base 12 is attached to the rotational support axis 24 so as to rotate relative to the rotational support axis 24, and the electromotive rotational unit 13 is configured to rotate the mirror base 12 directly, not indirectly via the rotational support axis 24.

[B]

While the first opening 21a is provided to intersect the first ridgeline 211 of the beltline reinforcement 21 as the frame member in the present embodiment, the present invention does not necessarily require the first opening 21a because this first opening 21a is just provided to pass the harness 25 therethrough. Thus, the beltline reinforcement 21 may not have the first opening 21a. That is, there may be another modified example of the present invention, in which the first opening 21a is not provided, the beltline reinforcement 21 has the first ridgeline 211 which is positioned on the outward side Y2, in the vehicle width direction, of the beltline reinforcement 21 and extends in the vehicle longitudinal direction X, and the support member 22 is fixed to the vertical both-side positions of the first ridgeline 211 at the beltline reinforcement 21. Even in this structure, the beltline reinforcement 21 is positioned on the outward side Y2 and the first ridgeline 211 extending in the vehicle longitudinal direction X is provided, so that a part of the beltline reinforcement 21 which is positioned along the first ridgeline 211 has the high rigidity as well. The support member 22 is fixed to the vertical both-sides of the first ridgeline 211 at the beltline reinforcement 21, so that the support rigidity of the mirror unit 16 is improved.

[C]

The mirror of the present invention includes any type as long as means for obtaining the rearward visual field is adopted. For example, the optical mirror 14 to obtain the rearward visual filed by reflection of the light from the vehicle rearward side or a so-called digital mirror capable of obtaining the rearward visual field by means of a television camera provided at the door-mirror body portion 11 are included in the concept of the mirror of the present invention.

What is claimed is:

1. A door mirror structure of a side door of a vehicle, comprising:
    a mirror unit;
    a frame member provided inside the side door; and
    a support member fixing the mirror unit to the frame member,
    wherein said mirror unit comprises a door-mirror body portion which is provided with a mirror to obtain a rearward visual field of the vehicle, a mirror base which has a tip-end portion fixed to said door-mirror body portion and a base-end portion provided away from said tip-end portion, a rotational support axis which is connected to said base-end portion of the mirror base and rotatably supports said door-mirror body portion and said mirror base between a mirror-use position where the mirror is visible from a cabin inside and a mirror-storage position which is located on an inward side, in a vehicle width direction, of the mirror-use position, and an electromotive rotational unit which rotates said door-mirror body portion and said mirror base between the mirror-use position and the mirror-storage position around an axis line of said rotational support axis, and
    said electromotive rotational unit is provided inside the side door.

2. The door mirror structure of claim 1, wherein said rotational support axis is provided to pass between said support member and said frame member, a harness which is connected to a portion of the rotational support axis which is located at a point where the support member and the frame member overlap with each other in a direction perpendicular to an axis-line direction of the rotational support axis is provided, said frame member has a first opening where said harness is inserted at a portion thereof which overlaps with the support member, a size of said first opening is large enough to prevent the harness from contacting an inner peripheral edge of the first opening during the rotation of said door-mirror body portion and said mirror base, and said support member has a pair of fixation portions which are fixed to the frame member at both-side positions of the first opening.

3. The door mirror structure of claim 2, wherein said frame member has a first ridgeline which is positioned at an outward side, in the vehicle width direction, of the frame member and extends in a vehicle longitudinal direction, said first opening is formed at a point where the first opening intersects said first ridgeline, and said pair of fixation portions of the support member are fixed to the frame member at respective positions which correspond to the both-side positions of the first opening in a direction along said first ridgeline and to vertical both-side positions of the first ridgeline.

4. The door mirror structure of claim 3, wherein said support member further has a holding portion which has a second opening facing said first opening of the frame member and holds said rotational support axis in a state where the support member encloses an outer periphery of the rotational support axis, said pair of fixation portions are connected to both sides of said holding portion such that the fixation portions interpose the holding portion therebetween, and said harness is connected to the rotational support axis in a state where the harness is inserted into said first opening and said second opening.

5. The door mirror structure of claim 4, wherein said support member further has a rib which connects said holding portion and said fixation portion.

6. The door mirror structure of claim 5, wherein said support member is made of aluminum dicast.

7. The door mirror structure of claim 6, wherein said rotational support axis is fixed to said base-end portion of the mirror base and configured to be rotatable around the axis line of the rotational support axis together with the mirror base by receiving a rotational drive force of said electromotive rotational unit.

8. The door mirror structure of claim 4, wherein said frame member is a beltline reinforcement which extends in a vehicle longitudinal direction along a beltline of a window lower-end edge of the side door.

9. The door mirror structure of claim 8, wherein said support member is made of aluminum dicast.

10. The door mirror structure of claim 9, wherein said rotational support axis is fixed to said base-end portion of the mirror base and configured to be rotatable around the axis line of the rotational support axis together with the mirror base by receiving a rotational drive force of said electromotive rotational unit.

11. The door mirror structure of claim 1, wherein said frame member is a beltline reinforcement which extends in a vehicle longitudinal direction along a beltline of a window lower-end edge of the side door.

12. The door mirror structure of claim 1, wherein said support member is made of aluminum dicast.

13. The door mirror structure of claim 1, wherein said rotational support axis is fixed to said base-end portion of the mirror base and configured to be rotatable around the axis line of the rotational support axis together with the mirror base by receiving a rotational drive force of said electromotive rotational unit.

14. The door mirror structure of claim 1, wherein said frame member has a first ridgeline which is positioned at an outward side, in the vehicle width direction, of the frame member and extends in a vehicle longitudinal direction, and said support member is fixed to the frame member at respective positions which correspond to vertical both-side positions of the first ridgeline.

* * * * *